(12) United States Patent
Furze et al.

(10) Patent No.: US 12,395,731 B2
(45) Date of Patent: Aug. 19, 2025

(54) DEVICES, SYSTEMS, AND METHODS FOR SYNCHRONIZING LIGHTING AND IMAGING DEVICES

(71) Applicant: ACUSHNET COMPANY, Fairhaven, MA (US)

(72) Inventors: Paul A. Furze, Tiverton, RI (US); Brett S. Southworth, Acushnet, MA (US); Jeremy Zorrilla De Los Santos, Whitinsville, MA (US)

(73) Assignee: ACUSHNET COMPANY, Fairhaven, MA (US)

( * ) Notice: Subject to any disclaimer, the term of this patent is extended or adjusted under 35 U.S.C. 154(b) by 142 days.

(21) Appl. No.: 18/479,333

(22) Filed: Oct. 2, 2023

(65) Prior Publication Data

US 2025/0113100 A1   Apr. 3, 2025

(51) Int. Cl.
*H04N 23/60* (2023.01)
*A63B 69/36* (2006.01)
*H04N 23/90* (2023.01)

(52) U.S. Cl.
CPC ....... *H04N 23/665* (2023.01); *A63B 69/3614* (2013.01); *H04N 23/64* (2023.01); *H04N 23/90* (2023.01); *A63B 2220/05* (2013.01); *A63B 2220/16* (2013.01); *A63B 2220/806* (2013.01)

(58) Field of Classification Search
CPC ...... H04N 23/665; H04N 23/64; H04N 23/90; A63B 69/3614; A63B 2220/05; A63B 2220/16; A63B 2220/806

USPC .......................................................... 348/362
See application file for complete search history.

(56) References Cited

U.S. PATENT DOCUMENTS

| | | | |
|---|---|---|---|
| 5,471,383 A | 11/1995 | Gobush et al. | |
| 7,086,955 B2 | 8/2006 | Gobush et al. | |
| 7,395,696 B2 | 7/2008 | Bissonnette et al. | |
| 8,500,568 B2 | 8/2013 | Bissonnette et al. | |
| 2013/0321581 A1* | 12/2013 | El-Ghoroury | G02B 27/123 348/340 |
| 2020/0408917 A1* | 12/2020 | Fereyre | G01S 7/484 |

* cited by examiner

*Primary Examiner* — Usman A Khan
(74) *Attorney, Agent, or Firm* — Finnegan, Henderson, Farabow, Garrett & Dunner, LLP (57) ABSTRACT

In some implementations, a system may include an imaging device, at least one sensor configured to capture position data associated with positions of an object, a lighting device configured to emit a light in response to receiving a triggering signal, the triggering signal being determined based on synchronization pulses emitted by the imaging device. The system may include a control unit, the control unit being configured to: receive imaging data from the imaging device including the synchronization pulses, each synchronization pulse being associated with a frame captured by the imaging device; receive the position data from the at least one sensor; determine a sequence of triggering signals by calculating, based on the imaging data and the position data, a number of synchronization pulses to skip between emissions of successive triggering signals; and transmit the triggering signals to the lighting device.

20 Claims, 5 Drawing Sheets

DEVICES, SYSTEMS, AND METHODS FOR SYNCHRONIZING LIGHTING AND IMAGING DEVICES

TECHNICAL FIELD

The present disclosure relates generally to devices, systems, and methods for synchronizing devices, and more particularly to synchronizing lighting devices with imaging devices.

BACKGROUND

Golf players typically use golf ball launch monitors to assess the quality of their golf swings by determining various parameters associated with a flight of a golf ball when it is hit by a golf club. Such flight parameters may include speed of the golf ball, trajectory of the golf ball, spin of the golf ball, an angle at which the golf club hits the golf ball, and/or other flight parameters that may determine how far or how fast the golf ball will travel. Launch monitors may include one or more cameras and one or more strobe lights to illuminate and freeze the motion of a rapidly moving object (e.g., golf ball or head of a golf club) at a precise time. The strobe lights emit flashes of light at predetermined time intervals, and the cameras capture images of the golf ball and/or the golf club each time the golf ball or golf club is illuminated by a flash of light. The images are analyzed to determine changes in position of the golf ball or golf club in the time elapsed between successive flashes of light. This data is then used to determine one or more of the parameters described above.

To freeze the motion of an object, the duration of the flash of light emitted by the strobe lights must be short. Otherwise, the image of the object captured by the camera will blur on the leading and trailing edges by an amount equal to the distance that the object moves while the strobe light is on (i.e., during the time the strobe light illuminates the object). A shorter flash produces less blur. However, reducing the duration of the flash results in less light being available for illuminating the object, which in turn may lead to darker images, making it difficult to accurately determine the position of the object from the images.

A speed of the object is determined from the captured images by determining the change in position of the object divided by the time over which such change occurs. The time period for the change in position is determined based on the times at which the images are captured by the cameras (or based on a flash duration and/or frequency of a strobe device). Thus, any error in determining the time period between successive flashes of light (which corresponds to the times when the cameras capture images of the object) produces a corresponding error in the measurement of speed.

Strobe lights in conventional launch monitors employ one or more flashtubes as the lighting element. Although a flashtube can produce a great deal of light, it requires at least a few milliseconds to recharge. Because the field of view of the launch monitor cameras is not very wide, however, the duration between flashes must be relatively short (of the order of microseconds instead of milliseconds) to be able to capture more than one image of the object as it traverses the field of view. Some solutions to the problem of the relatively large recharge time of a flashtube include using multiple flashtubes or using a single flashtube with multiple power supplies and controllers. However, use of multiple flashtubes and/or power supplies is likely to produce variation in the brightness of the light emitted in successive flashes and/or variation in the duration between flashes. Such variations introduce error in the determination of the one or more flight parameters associated with the object. Furthermore, adding components such as flashtubes, power supplies, and/or controllers undesirably increases the cost, size, and weight of the launch monitor.

Furthermore, utilizing a strobe light with a high speed video camera presents an additional challenge, since the strobe light must illuminate at the same time that the electronic shutter of the camera opens. Yet another challenge exists in accommodating voltage differences between signals from various sources such as an imaging device and a controller controlling the lighting device.

The devices, systems, and methods of the present disclosure solve one or more of the problems set forth above and/or other problems of the prior art.

SUMMARY

In some embodiments, a device for synchronizing an imaging device with a lighting device may include an imaging device configured to capture at least one image of a first object. The device for synchronizing an imaging device with a lighting device may also include at least one sensor configured to capture position data associated with positions of a second object. The device for synchronizing an imaging device with a lighting device may further include a lighting device configured to emit a light in response to receiving a triggering signal, the triggering signal being determined based on synchronization pulses emitted by the imaging device. The device for synchronizing an imaging device with a lighting device may include a control unit in communication with the imaging device, the at least one sensor, and/or the lighting device. In some embodiments, the control unit may be configured to: receive imaging data, including the at least one image, from the imaging device; receive the synchronization pulses from the imaging device, each synchronization pulse of the synchronization pulses being associated with a frame captured by the imaging device; receive the position data from the at least one sensor; determine a sequence of triggering signals by calculating, based on the imaging data and the position data, a number of the synchronization pulses to skip between emissions of successive triggering signals in the sequence of triggering signals; and transmit the sequence of triggering signals to the lighting device.

In some embodiments, the calculated number of synchronization pulses to skip between the emissions of each pair of successive triggering signals may be the same. In some embodiments, the control unit may further be configured to receive additional data, the additional data including a frame rate associated with the imaging device, and calculating the number of the synchronization pulses to skip between emissions of successive triggering signals may be based on the additional data. In some embodiments, the imaging device may include at least two cameras. In some embodiments, the second object may be a golf club and the control unit may further be configured to receive additional data including a speed of the golf club, the speed may be calculated based on the position data and a distance between the at least one sensor, and calculating the number of the synchronization pulses to skip between emissions of successive triggering signals may be based on the additional data. In some embodiments, the control unit may further be configured to calculate an amount of time during which the golf club or the first object (e.g., a golf ball) is within a field of view of the imaging device. In some embodiments, the control unit may further be configured to calculate the number of synchronization pulses to skip between emissions of successive triggering signals based on a frame rate associated with the imaging device and a desired number of total emissions of the lighting device. In some embodiments, the first object may be a golf ball. In some embodiments, the control unit may include a field programmable gate array (FPGA) or a microcontroller. In some embodiments, the FPGA or microcontroller may receive input data from a computer, the input data including at least one of a desired number of total emissions of the lighting device, a duration of each of the emissions of the lighting device, or a signal to arm the control unit in preparation for receiving data from one of the at least one sensor. In some embodiments, the FPGA or microcontroller may further receive input signals, the input signals including at least one signal from at least one of the at least one sensor that detects a swinging golf club. In some embodiments, the FPGA or microcontroller may output a triggering signal to the lighting device based on the received input data from the computer and the received input signals. In some embodiments, the control unit may further include a memory configured to store at least one of the position data, the imaging data, or data associated with the one or more synchronization pulses. In some embodiments, a user device may be configured to receive additional input data having an user input, and the control unit may be configured to determine the sequence of triggering signals based further on the user input.

In some embodiments, a system may include an imaging device configured to capture at least one image of a first object. The system may also include at least one sensor configured to capture position data associated with positions of a second object. The system may further include a lighting device configured to emit a light in response to receiving a triggering signal, the triggering signal being determined based on synchronization pulses emitted by the imaging device. The system may include a control unit in communication with the imaging device, the at least one sensor, and the lighting device. The system may include at least one memory storing instructions. The system may also include at least one processor configured to execute the instructions to perform operations for synchronizing the imaging device with the lighting device. In some embodiments, the operations may include: receiving imaging data, including the at least one image, from the imaging device; receiving synchronization pulses from the imaging device, each synchronization pulse of the synchronization pulses being associated with a frame captured by the imaging device; receiving the position data from the at least one sensor; determining a sequence of triggering signals by calculating, based on the imaging data and the position data, a number of the synchronization pulses to skip between emissions of successive triggering signals in the sequence of triggering signals; and transmitting the sequence of triggering signals to the lighting device.

In some embodiments, a method for synchronizing an imaging device with a lighting device may include capturing position data associated with positions of an object via at least one sensor, the at least one sensor being communicatively coupled to a control unit, a lighting device, and an imaging device, the lighting device being configured to emit a light in response to receiving a triggering signal from the control unit, the triggering signal being determined based on synchronization pulses emitted by the imaging device. The method may include receiving, at the control unit, the synchronization pulses from the imaging device, each synchronization pulse of the synchronization pulses being associated with a frame captured by the imaging device. The method may further include receiving, at the control unit, the position data from the at least one sensor. The method may include determining, at the control unit, a sequence of triggering signals by calculating, based on the synchronization pulses and the position data, a number of the synchronization pulses to skip between emissions of successive triggering signals in the sequence of triggering signals. The method may include transmitting, from the control unit, the sequence of triggering signals to the lighting device.

BRIEF DESCRIPTION OF THE DRAWINGS

The foregoing and other aspects of the present disclosure are best understood from the following detailed description when read in connection with the accompanying drawings. It is to be understood that the disclosure is not limited to the illustrated or disclosed embodiments. Included in the drawings are the following Figures.

DETAILED DESCRIPTION

Figure 1:
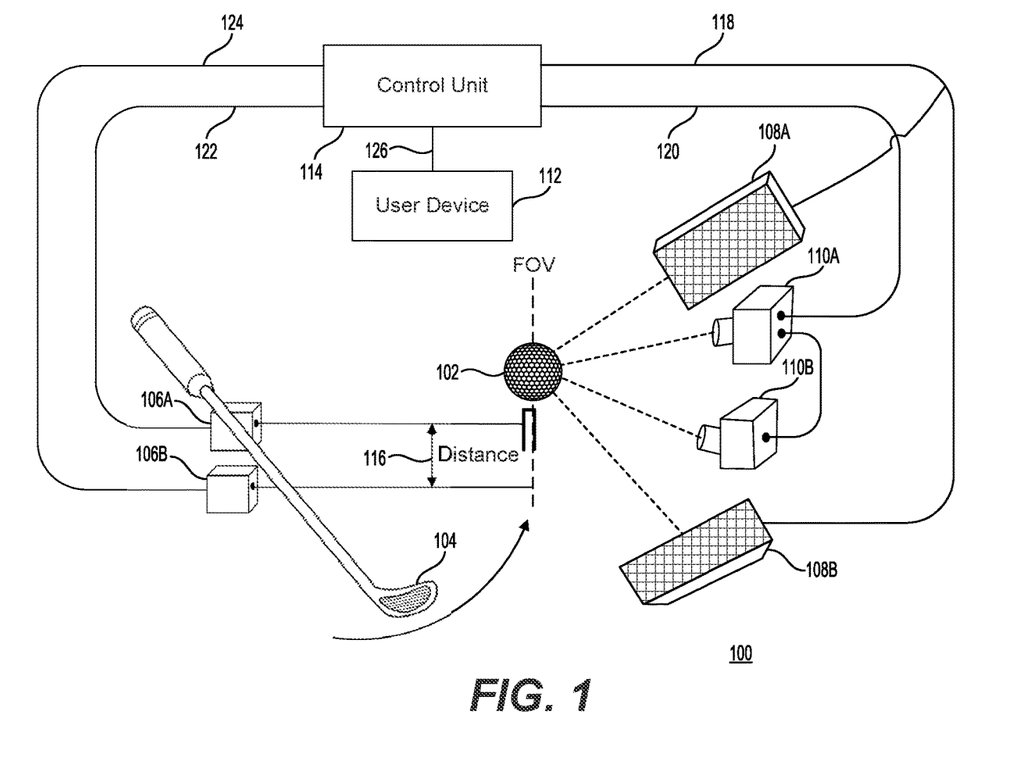
FIG. 1 is a block diagram of an exemplary system for synchronizing a lighting device with an imaging device, consistent with disclosed embodiments.

FIG. 1 illustrates an exemplary embodiment of a system 100 for synchronizing a lighting device 108A, 108B and imaging device 110A, 110B. In some exemplary embodiments, system 100 includes an imaging device including camera 110A and camera 110B, the imaging device being configured to capture at least one image of a first object 102. It is contemplated that imaging device 110A, 110B may include still or video cameras, high speed cameras, charge coupled device (CCD) cameras, or other types of digital cameras configured to obtain one or more digital images of the field of view of the system. A field-of-view associated with system 100 may include a portion of an environment in front of imaging device 110A, 110B that may be imagable by imaging device 110A, 110B. In some exemplary embodiments, imaging device 110A, 110B may include a camera configured to capture an image of the field-of-view associated with the system 100.

Each camera of the imaging device 110A, 110B may include a light-receiving aperture, shutter, and light sensitive surface. Each camera of the imaging device 110A, 110B may also be directed and focused on a predetermined field-of-view in which an object moves and may be imaged.

In some exemplary embodiments, system 100 further includes at least one sensor 106A, 106B configured to capture position data (including time data) associated with positions of a second object 104. In some exemplary embodiments, a laser or other signal may be used by sensors 106A, 106B to initiate operation of a synchronization. For example, the initiating means may include a light beam emitted by at least one of sensors 106A, 106B. When the moving object 104 passes through the light beam, the sensor may send a signal to control unit 114, which in turn may initiate operations of lighting device 108A, 108B and/or imaging device 110A, 110B. When a laser is used, the laser may be arranged such that the moving object (e.g., a golf club) breaks the laser beam prior to a time of contact with object 102. That is, the laser may be aligned behind object 102 (e.g., a teed golf ball) and imaging device 110A, 110B may be configured to capture images of the object 102 during contact and shortly after contact with object 104.

In some exemplary embodiments, system 100 also includes a lighting device including a first strobe 108A and a second strobe 108B, the lighting device being configured to emit a light in response to receiving a triggering signal, the triggering signal being determined based on synchronization pulses emitted by the imaging device 110A, 110B. Lighting device 108A, 108B may be configured to emit one or more strobes or flashes of light to illuminate an object 102 traversing the field-of-view. It is contemplated that lighting device 108A, 108B may include any number of light assemblies and/or strobes.

A duration of light emitted by lighting device 108A, 108B may be determined based on a trigger signal used to activate the lighting device 108A, 108B. For example, control unit 114 may be configured to generate a trigger signal that may in turn control a duration or a sequence of durations for which electric current flows through lighting device 108A, 108B thereby causing the lighting device 108A, 108B to emit light. In some exemplary embodiments, a duration (or time period) for which lighting device 108A, 108B emits light may be adjustable in a range from a fraction of a microsecond to several milliseconds or seconds. Control unit 114 may also be configured to control a duration or time period between successive flashes of light by controlling the trigger signals. For example, control unit 114 may generate successive trigger signals at varying time durations to control or adjust a frequency with which lighting device 108A, 108B emits flashes of light. Because lighting device 108A, 108B emits light in response to the trigger signals generated by control unit 114, the duration of each flash of light and the timing between successive flashes of light emitted by lighting device 108A, 108B may be precisely controlled.

As also discussed above, lighting device 108A, 108B may be configured to emit light during the time period when current flows through a semiconductor device associated with lighting device 108A, 108B. Thus, a duration and frequency of current flow through lighting device 108A, 108B may be controlled to adjust the duration of each flash of light, and/or the duration between successive flashes of light emitted by lighting device 108A, 108B. For example, control unit 114 may be configured to generate a trigger signal that may determine a duration for which current may flow through a semiconductor device associated with lighting device 108A, 108B. Similarly, control unit 114 may generate a trigger signal that may stop the current flow through the semiconductor device associated with lighting device 108A, 108B for a predetermined time period. Control unit 114 may also be configured to subsequently generate a trigger signal that may cause current to flow through the semiconductor device associated with lighting device 108A, 108B after the predetermined period of time. Thus, control unit 114 may be configured to control the duration between successive emissions of light (e.g., the predetermined time period) from lighting device 108A, 108B. Accordingly, by modulating the trigger signals provided to lighting device 108A, 108B, control unit 114 may be configured to control the duration and frequency of flashes of light emitted by lighting device 108A, 108B. It is contemplated that control unit 114 may be configured to generate the trigger signals such that lighting device 108A, 108B may be able to emit successive flashes of light within a few microseconds of each other. Furthermore, control unit 114 may be configured to control a rate (or frequency) at which trigger signals are generated and supplied to lighting device 108A, 108B, thus controlling the duration between successive flashes of light emitted by lighting device 108A, 108B.

In some exemplary embodiments, system 100 further includes a control unit 114 in communication with the imaging device 110A, 110B, the at least one sensor 106A, 106B, and the lighting device 108A, 108B. In some exemplary embodiments, system 100 may include control unit 114 and a power supply (not shown in FIG. 1). Control unit 114 may include, for example, one or more controllers that may be associated with one or more memories, one or more databases, one or more communications devices, one or more input-output devices, one or more sensors, and/or any other electronic devices that may be required to control operations of the system 100. Control unit 114 may include or be associated with one or more processors. For example, control unit 114 may embody a single microprocessor or multiple microprocessors, digital signal processors (DSPs), application-specific integrated circuit devices (ASICs), etc. Numerous commercially available microprocessors may be configured to perform the functions of control unit 114. Various other known circuits may be associated with control unit 114, including power supply circuits, signal-conditioning circuits, and/or communication circuits.

The one or more memory devices associated with control unit 114 may store, for example, data and/or one or more control routines, instructions, mathematical models, algorithms, machine learning models, etc. The one or more memory devices may embody non-transitory computer-readable media, for example, Random Access Memory (RAM) devices, NOR or NAND flash memory devices, and Read Only Memory (ROM) devices, CD-ROMs, hard disks, floppy drives, optical media, solid state storage media, etc. Control unit 114 may execute one or more routines, instructions, mathematical models, algorithms, and/or machine learning models stored in the one or more memory devices to generate and deliver one or more command signals to one or more of imaging device 110A, 110B, lighting device 108A, 108B, sensors 106A 106B, and/or other components of system 100.

A power supply may be configured to supply power for operation of one or more components of system 100. For example, a power supply may be configured to supply power for operation of imaging devices 110A, 110B, lighting device 108A, 108B, sensors 106A, 106B, control unit 114, and/or other components of system 100. A power supply may be electrically connected to the one or more components of system 100 via one or more connectors or wires (not shown in FIG. 1). In some embodiments, a power supply may include a battery. In other embodiments, a power supply may be connectable to an external power grid for receiving power from the external power grid. Multiple power supplies may be connected to control unit 114 to accommodate the needs of the various devices. For example, the inputs from the sensors 106A and 106B may be one voltage, the trigger signals to the strobes 108A and 108B may be another voltage, and the trigger signals to the imaging devices 110A and 110B may be a yet another voltage. These various signal levels may be controlled through the control unit 114.

One or more communication lines 118, 120, 122, 124, 126 may transfer signals from imaging device 110A, 110B, lighting device 108A, 108B, sensors 106A, 106B, and/or user device 112, respectively, to or from control unit 114 and/or to or from the one or more memory devices associated with control unit 114. Communication lines 118, 120, 122, 124, 126 may include, e.g., serial communication lines, universal serial bus (USB) communication lines, Ethernet communication lines, or inter-integrated circuit (I2C) communication lines. It is contemplated, however, that in some exemplary embodiments, imaging device 110A, 110B, lighting device 108A, 108B, sensors 106A, 106B, and/or user device 112 may be configured to transfer or receive signals representative of the captured images wirelessly to or from control unit 114 and/or to or from the one or more memory devices associated with control unit 114.

In some exemplary embodiments, system 100 may include user device 112. A user device may refer to any hardware or software-hardware combination associated with a user that may allow for transmission of information to or from the system 100 (e.g., via control unit 114). A user device may include, e.g., a mobile device, laptop, tablet, computer, smart device, and/or other computing devices. User device 112 may be communicatively connected with control unit 114 in order to send and receive information, respectively, to and from the control unit 114. Control unit 114 may include a controller such as a Field Programmable Gate Array (FPGA) or another highly configurable and reprogrammable digital logic device. Alternatively, the controller may be a microcontroller (e.g., a compact integrated circuit (IC) that may include a processor (CPU), memory (RAM and ROM), and input/output peripherals). The control unit 114 may receive input data from various components of the system 100. The input data may include, from user device 112, a desired number of emissions of light (e.g., strobe flashes), a desired duration of each emission of light (e.g., flash duration), and a signal for initiating the control unit 114 in preparation for generating a trigger signal (e.g., a signal to arm the control unit 114). The input data may also include, from sensors 106A, 106B, a signal indicating a detection of a second object 104 (e.g., a signal detecting a swinging golf club). Further, the input may include, from imaging device 110A, 110B, a synchronization signal including synchronization pulses. The synchronization signal may be produced by imaging device 110A, 110B (e.g., a master camera of imaging device 110A, 110B) to control the operation of various components of imaging device 110A, 110B (e.g., one or more slave cameras of imaging device 110A, 110B). The same synchronization signal may be sent to and utilized by control unit 114 such that control unit 114 may properly time the generation and transmittal of trigger signals (or a sequence thereof) to lighting device 108A, 108B. Based on the combination of input data received by control unit 114, control unit 114 may output a trigger signal (or a sequence thereof) to lighting device 108A, 108B.

For example, control unit 114 may receive a synchronization signal comprising continuous synchronization pulses from imaging device 110A, 110B. Control unit may also receive a desired number of emissions of light (e.g., strobe flashes) and a desired duration of each emission of light (e.g., flash duration) from user device 112. Control unit 114 may receive an initiation signal from user device 112, the initiation signal indicating that the control unit 114 should prepare to generate and transmit a trigger signal to lighting device 108A, 108B. Control unit 114 may receive a signal from sensors 106A, 106B indicating the detection of second object 104 (e.g., a golf club entering the field-of-view of imaging device 110A, 110B). Control unit 114 may generate one or more trigger signals to be transmitted to lighting device 108A, 108B and transmit each of the one or more trigger signals in synchrony with each synchronization pulse received after the signal from sensors 106A, 106B. Here, synchrony may include simultaneous or near simultaneous transmission. For example, near simultaneous transmission may include transmission within a few microseconds, few tenths of a microsecond, few hundredths of a microsecond or within a minimum time duration determinable by one or more components of the disclosed system (e.g. smallest time duration determined by a clock or timing mechanism in the disclosed system). Control unit 114 may also control the duration of each light emission by controlling the length of each trigger signal based on the desired duration, as provided by the corresponding input data. Alternatively, control unit 114 may control the duration of each light emission by controlling the length of each trigger signal based on input data received from imaging device 110A, 110B (e.g., frame rate, frame length, etc.). Control unit 114 may continue to generate and transmit trigger signals based on synchronization pulses received for the desired number of emissions of light, as provided by the corresponding input data. Alternatively, control unit 114 may continue to generate and transmit trigger signals based on synchronization pulses received until a second signal is received from sensors 106A, 106B indicating a second detection of second object 104 (e.g., a golf club exiting the field-of-view of imaging device 110A, 110B). Thus, for each trigger signal received from control unit 114, lighting device 108A, 108B may emit light for a particular duration and in synchrony with the operations of imaging device 110A, 110B (e.g., in unison with the opening of one or more shutters of imaging device 110A, 110B). The system may thereby coordinate the synchronization signal or pulses provided by an imaging device with the illuminations provided by a lighting device, and provide a desired number of illuminations which are seamlessly synchronized with the openings of the electronic shutter(s) of the imaging device.

Figure 2:
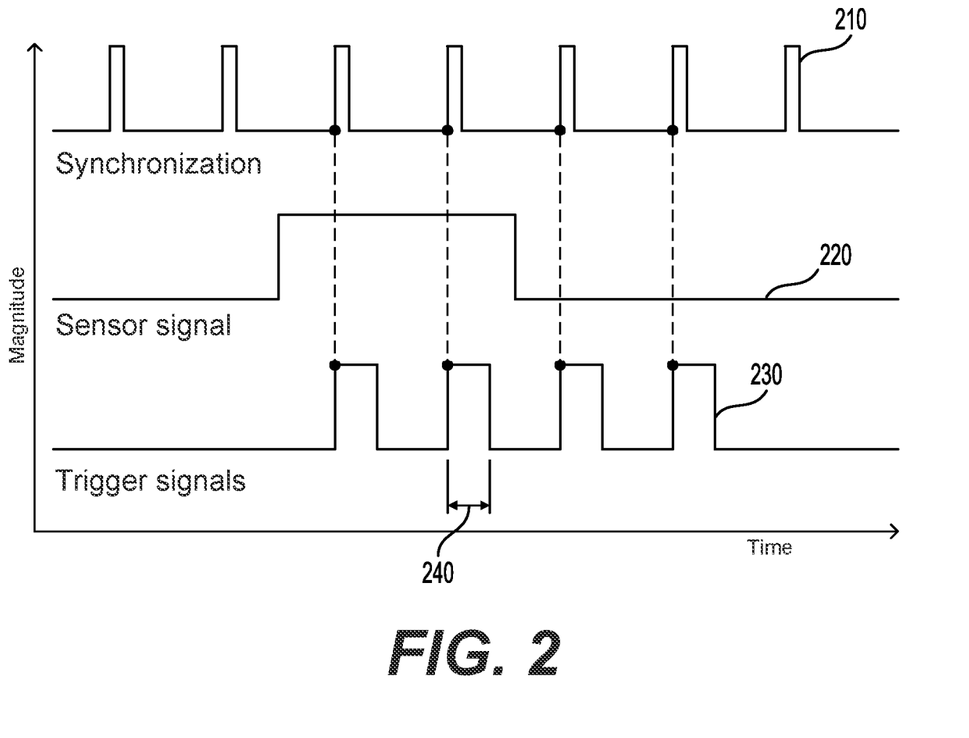
FIG. 2 is a graphical representation of exemplary synchronized signals, consistent with disclosed embodiments.

FIG. 2 shows a graphical representation of the synchronization of signals, as performed by a system. As shown in the example of FIG. 2, synchronization pulses 210 may be received by control unit 114. The synchronization pulses may be provided by a camera of an imaging device, such as the main (or master) camera in an array of cameras. The control unit 114 may also receive a signal to arm, indicating to the control unit 114 that an object (e.g., second object 104) will soon be detected by sensors 106A, 106B. When an object is detected by one or more of sensors 106A, 106B, the control unit 114 may receive a signal indicating the detection, at which point the control unit 114 may generate and transmit a sequence of trigger signals 230, wherein each trigger signal is emitted in line (e.g., simultaneously or near simultaneously) with each synchronization pulse received. In the example shown in FIG. 2, the control unit 114 may receive data input from a user device 112, the data input including a desired flash duration and a desired number of flashes. In some embodiments, such data input may inform the control unit 114 of the number of trigger signals to send before stopping. In the example of FIG. 2, the control unit 114 transmits four trigger signals 230, each having a duration 340 determined based on the received data input (e.g., from a user).

In some exemplary embodiments, control unit 114 or user device 112 may further be configured to determine a speed of the second object 104 as the object 104 traverses the field-of-view. For example, control unit 114 or user device 112 may determine a distance traveled by the second object 104 based on the positions of the object 104 in the first image and the second image. Control unit 114 or user device 112 may also be configured to determine an amount of time elapsed between the time that imaging device 110A, 110B captured the first image and when imaging device 110A, 110B captured the second image. Control unit 114 or user device 112 may determine the time elapsed based on, for example, time stamps associated with the first image and the second image. In some embodiments, control unit 114 or user device 112 may determine the time elapsed using one or more internal clocks. Control unit 114 or user device 112 may be configured to determine a speed of the second object 104 based on the distance traveled by the object 104 and the time elapsed between capture of the first image and the second image. Control unit 114 or user device 112 may also be configured to use mathematical expressions or algorithms, lookup tables, programs, and/or trained machine learning models to determine other parameters such as a trajectory (e.g., mapping of positions of the object 104 over time) and/or spin (e.g., rate of rotation of object 104 about one or more axis associated with the object) based on the position and time data extracted from, for example, the first image and second image.

In some exemplary embodiments, an imaging device may utilize its maximum frame rate regardless of the speed of the first object 102 or second object 104. For example, a maximum frame rate may be used when the control unit 114 calculates a number of synchronization signals to skip between consecutive trigger signals. Such an embodiment may be useful to distribute a desired number of light emissions evenly across a time that the first object 102 and/or second object 104 may be in the field-of-view of the imaging device. In other words, the control unit 114 may calculate a number of synchronization pulses to skip between the emissions of each pair of successive triggering signals, and by doing so, the calculated number may be the same. The control unit 114 may then transmit evenly distributed trigger signals to a lighting device based on the calculated number of synchronization pulses to skip. Although evenly distributed trigger signals have been discussed, it is contemplated that in some exemplary embodiments, the number of synchronization pulses to skip between pairs of successive triggering signals may be variable. For example, the number of synchronization pulses to skip between a first pair of successive triggering signals may be greater than or less than the number of synchronization pulses to skip between a subsequent pair of successive triggering signals. In such a situation, if a video camera is used, it would be advantageous to have software in the user device 112 configured to analyze the video and extract only the frames that are illuminated by the lighting device.

Control unit 114 may calculate the number of synchronization pulses to skip based on a combination of inputs. The combination of inputs may include a known distance between sensors 106A, 106B. This distance may be determined by measuring the distance between a first sensor 106A and a second sensor 106B, both of which may be stationary. The combination of inputs may further include a time difference between a first signal received from the first sensor 106A (detecting a first position of an object) and a second signal received from the second sensor 106B (detecting a second position of the object). Based on the known distance between sensors 106A, 106B and the time difference between first and second signals, the control unit 114 may calculate a speed of an object (e.g., second object 104). Based on the calculated speed of the object, and additional input comprising a width of the field-of-view of an imaging device (e.g., imaging device 110A, 110B), the control unit 114 may further calculate an amount of time that the object is within the field-of-view of the imaging device. Based on the calculated amount of time that the object is within the field-of-view of the imaging device, and additional input comprising the frame rate of the imaging device and a desired number of light emissions, the control unit 114 may calculate a number of synchronization pulses (and thus a number of frames of the imaging device) to skip between consecutive trigger signals (and thus emissions of light from the lighting device). For example, the control unit 114 may calculate the number of synchronization pulses to skip (S) using the following equation:

$$S = (T_s/D_s) * FOV * (FPS/N);$$

where $T_s$ refers to the time difference between a first sensor signal and a second sensor signal, FOV refers to the width of the field-of-view of the imaging device, $D_s$ refers to the distance between the first sensor and the second sensor, FPS refers to the frame rate of the imaging device (e.g., frames per second), and N refers to the desired number of light emissions (e.g., flashes).

Therefore, the speed of the second object may be calculated based solely on data received from the sensors and need not be calculated based on image data from the imaging device, which may instead require additional computing power or time at least because the imaging device data such as images of the object(s) may need to be analyzed and/or processed further by the control unit before determining the speed of the object(s). In contrast, the control unit may receive only sensor data (e.g., two signals indicating the detection of the object at two positions, such that a time difference may be determined between the two signals). This provides the advantages of increased performance and less consumption of resources. Furthermore, because the control unit is able to calculate the speed of the object in near-real time based on the position data (including time data), variations in the actual speed of the object do not affect the synchronization of the lighting device with the imaging device. As such, in exemplary embodiments where the second object is a golf club, the manner of swinging the golf club may be irrelevant to the output provided by the control unit. For example, regardless of the various swing speeds of different human users, the system is able to seamlessly synchronize the lighting device with the imaging device. As another example, if the golf club is being swung by a machine (e.g., a robot), the swing speed, although more consistent than the swing speed of various human users, may be calculated in a similar manner to ensure that variations in swing speed, however small, are also accounted for.

Figure 3:
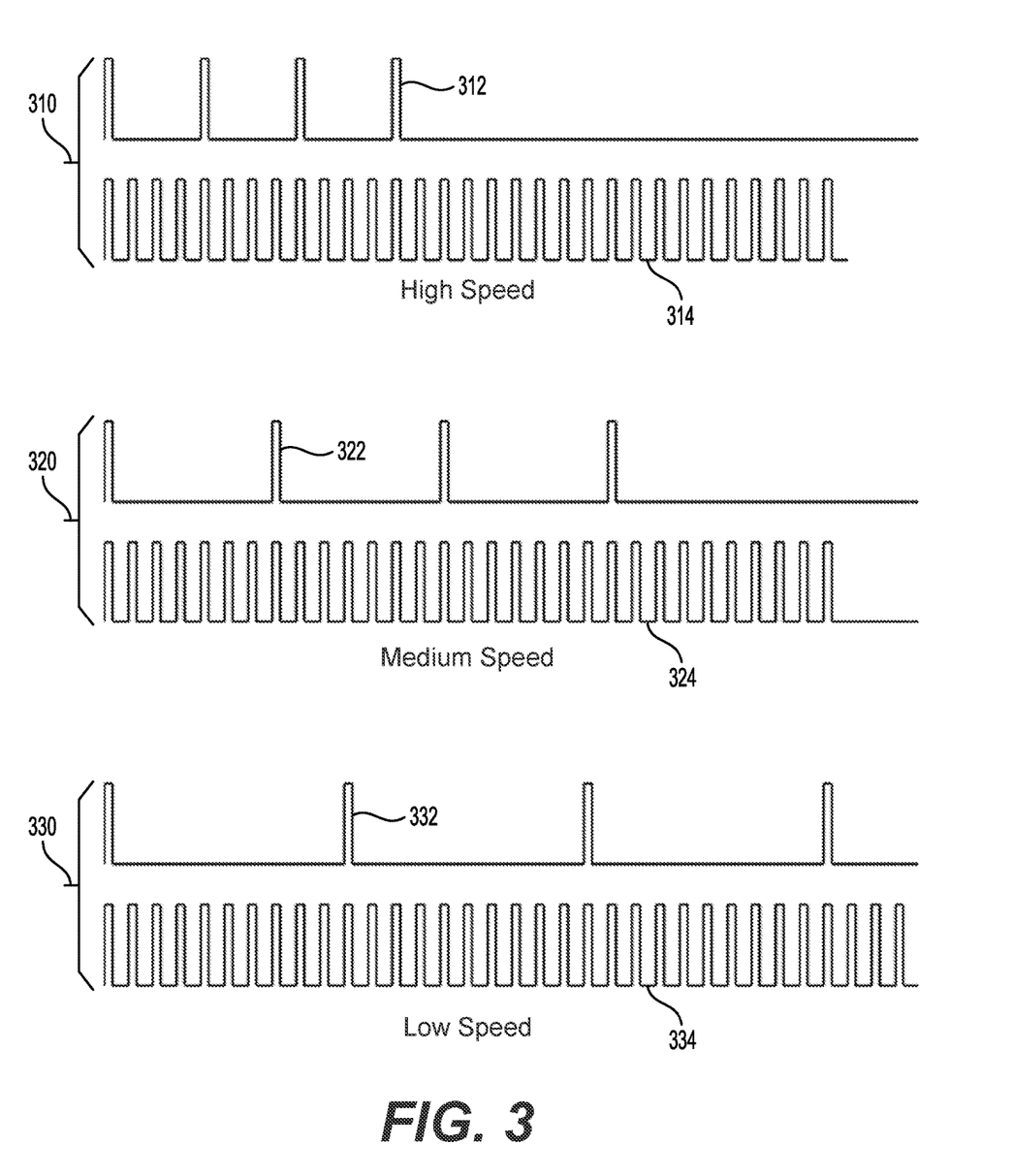
FIG. 3 is another graphical representation of exemplary synchronized signals, consistent with disclosed embodiments.

FIG. 3 shows a graphical representation of the synchronization of signals, as performed by an exemplary system. As shown in FIG. 3, the synchronization of signals may occur at a high speed 310, at a medium speed 320, or at a low speed 330. The type of speed may be determined based on the calculated number of synchronization signals to skip between consecutive trigger signals. The examples of FIG. 3 show a desired number of light emissions to be four; however, it is contemplated that the desired number of light emissions may be any number. For example, a high speed synchronization 310 may occur when a desired number of light emissions is four and the calculated number of synchronization pulses to skip is three. As shown in FIG. 3, four trigger signals 312 may be generated and transmitted to a lighting device, the four trigger signals 312 being transmitted in synchrony with synchronization pulses 314 but with three synchronization pulses being skipped between each trigger signal. As another example, a medium speed synchronization 320 may occur when a desired number of light emissions is four and the calculated number of synchronization pulses to skip is six. As also shown in FIG. 3, four trigger signals 322 may be generated and transmitted to a lighting device, the four trigger signals 322 being transmitted in synchrony with synchronization pulses 324 but with six synchronization pulses being skipped between each trigger signal. As yet another example, a low speed synchronization 330 may occur when a desired number of light emissions is four and the calculated number of synchronization pulses to skip is nine. As further shown in FIG. 3, four trigger signals 332 may be generated and transmitted to a lighting device, the four trigger signals 332 being transmitted in synchrony with synchronization pulses 334 but with nine synchronization pulses being skipped between each trigger signal.

Figure 4:
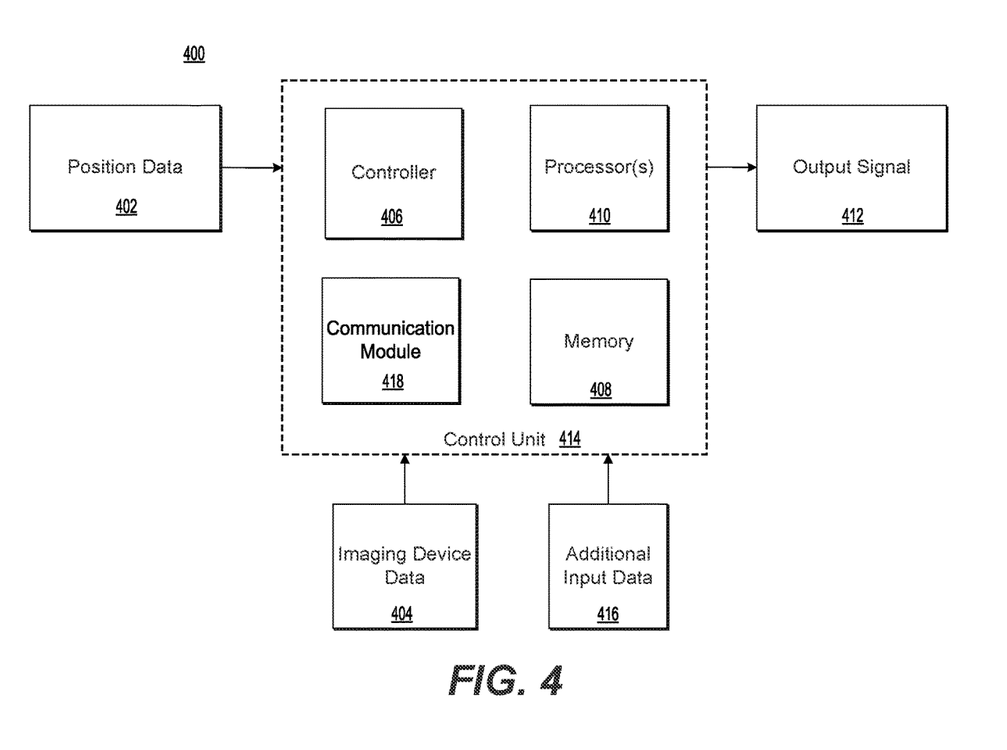
FIG. 4 is a block diagram of an exemplary operating environment, consistent with disclosed embodiments.

FIG. 4 shows an exemplary operating environment 400 including a control unit 414. Control unit 414 may include a controller 406. Controller 406 may be a FPGA or another highly configurable and reprogrammable digital logic device. Alternatively, the controller 406 may be a microcontroller (e.g., a compact integrated circuit (IC) that includes a processor (CPU), memory (RAM and ROM), and input/output peripherals). Control unit 414 may further include a communication module 418. A communication module may refer to any communication interface or communication device, with a hardware and/or software component that enables the exchange of data and information between different components of operating environment 400 and or system 100. Control unit 414 may also include at least one memory 408 storing instructions and at least one processor 410 configured to execute the instructions to perform operations for synchronizing an imaging device (e.g., imaging device 110A, 110B) with a lighting device (e.g., lighting device 108A, 108B). In some exemplary embodiments, the operations may comprise receiving imaging device data 404, including, e.g., a synchronization signal and/or synchronization pulses, imaging device specification (e.g., frame rate, exposure rate, other specifications related to the imaging device), and/or at least one image, from an imaging device. In some exemplary embodiments, each synchronization pulse may be associated with a frame captured by an imaging device. In some exemplary embodiments, the operations may also comprise receiving position data 402 from one or more sensors (e.g., sensors 106A, 106B). The position data 402 may include, e.g., a detected position of an object (e.g., second object 104). In some exemplary embodiments, control unit 414 may also receive additional input data 416. Additional input data 416 may include, e.g., data received from a user device (e.g., user device 112), which may include a desired emission duration and/or a desired number of emissions of a lighting device. In some exemplary embodiments, the operations may further comprise the control unit 114 determining a sequence of triggering signals by calculating, based on the imaging device data 404, the position data 402, and/or the additional input data 416, a number of triggering signals to send, a duration of each triggering signal, and a number of the one or more received synchronization pulses to skip between transmissions of successive triggering signals. In some exemplary embodiments, the operations may also comprise generating and transmitting an output signal 412 comprising the sequence of triggering signals to a lighting device (e.g., lighting device 108A, 108B).

Figure 5:
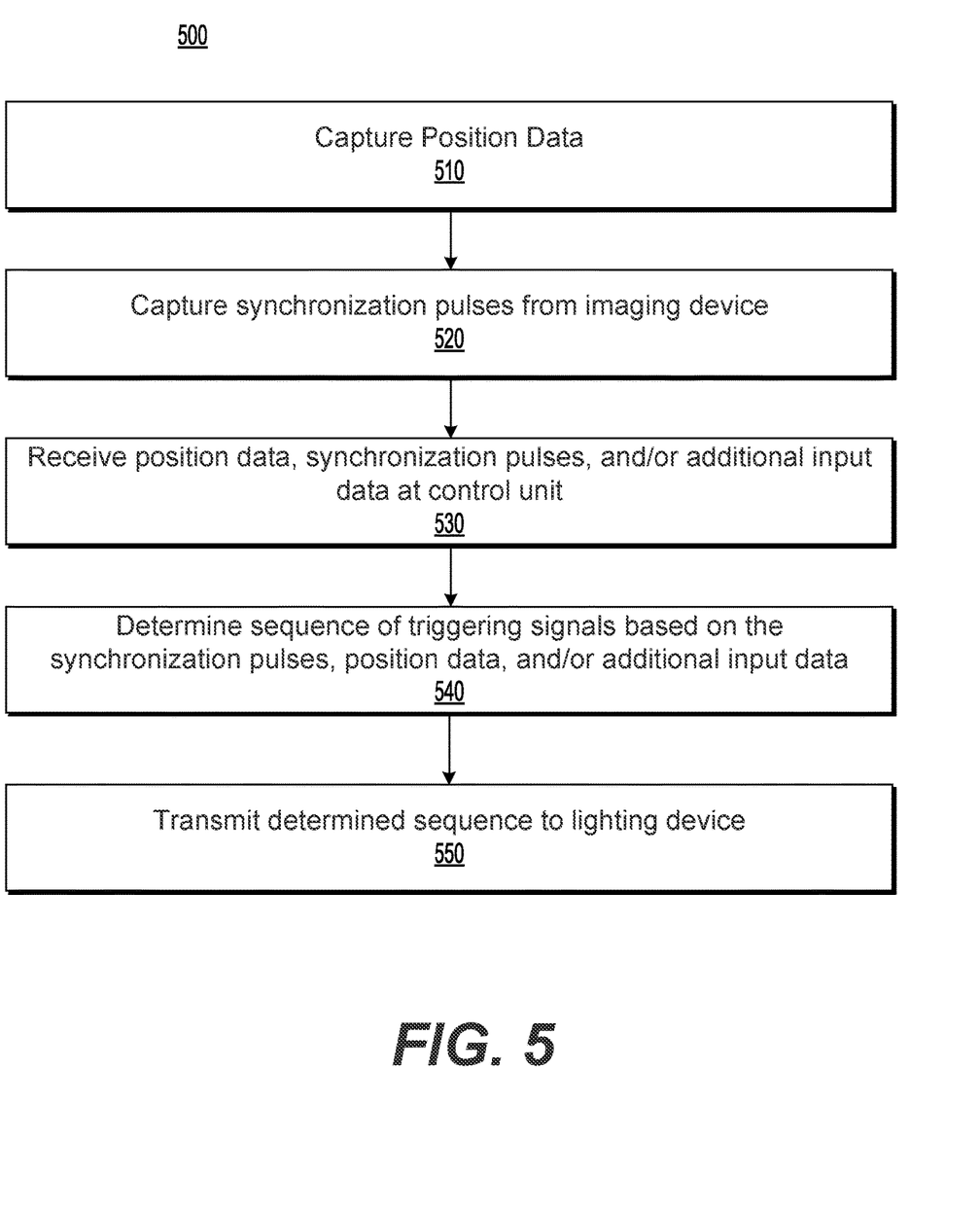
FIG. 5 is a flow chart of an exemplary method for synchronizing a lighting device with an imaging device, consistent with disclosed embodiments.

FIG. 5 illustrates an exemplary method 500 for synchronizing a lighting device 108A, 108B with an imaging device.

In one exemplary embodiment, at least one processor may execute instructions stored in a memory, storage medium, or database to perform method 500. The order and arrangement of steps in method 500 is provided for purposes of illustration. As will be appreciated from this disclosure, modifications may be made to method 500 by, for example, adding, combining, removing, and/or rearranging the steps of method 500. Method 500 may include a step of capturing position data associated with positions of an object via at least one sensor, the at least one sensor being communicatively coupled to a control unit, a lighting device, and an imaging device, the lighting device being configured to emit a light in response to receiving one or more triggering signals from the control unit, the one or more triggering signals corresponding with one or more synchronization pulses emitted by the imaging device (Step 510). Method 500 may include a step of capturing the one or more synchronization pulses from the imaging device, each synchronization pulse being associated with a frame captured by the imaging device (Step 520). Method 500 may include a step of receiving, at the control unit, the position data from the at least one sensor, the synchronization pulses from the imaging device, and/or additional input data (e.g., from a user device or computer) (Step 530). Method 500 may include a step of determining, at the control unit, a sequence of triggering signals by calculating, based on the synchronization pulses, the position data, and/or the additional input data a number of the synchronization pulses to skip between emissions of successive triggering signals (Step 540). Method 500 may include a step of transmitting, from the control unit, the sequence of triggering signals to the lighting device (Step 550).

Transmitting the sequence of triggering signals may include providing a first trigger signal to lighting device 108A, 108B, causing lighting device 108A, 108B to emit a first flash of light for a first time period. For example, control unit 114 may generate a first trigger signal that may determine an amount of current and a duration for the flow of the amount of current through one or more light sources of lighting device 108A, 108B. The duration of current flow through lighting device 108A, 108B may be determined by the first trigger signal generated by control unit 114 and may cause lighting device 108A, 108B to emit a first flash of light for a first time period (e.g., for the duration of the current flow). Furthermore, control unit 114 may generate a second trigger signal to be transmitted to lighting device 108A, 108B, causing lighting device 108A, 108B to emit a second flash of light for a second time period. Control unit 114 and lighting device 108A, 108B may perform functions similar to those discussed above, for example, with respect to the first trigger signal and first flash. For example, control unit 114 may be configured to control the duration for which current flows through one or more semiconductor devices associated with lighting device 108A, 108B. By controlling the duration of current flow in this manner, control unit 114 may be able to control the extent of the first and/or second time period for which lighting device 108A, 108B may emit flashes of light. It is contemplated that the first time period may be the same as or different from the second time period.

Imaging device 110A, 110B may also be configured to capture a first image of an object as the object traverses (e.g., moves through) the field-of-view during the first time period for which lighting device 108A, 108B may emit the first flash of light. Imaging device 11A, 110B may further be configured to capture a second image of an object as the object traverses the field-of-view during the second time period for which lighting device 108A, 108B may emit the second flash of light. Such a process may continue for as many captured images and flashes of light as desired (e.g., based on an input number of flashes and/or flash duration).

As described above, control unit 114 may be configured to control the duration of time that passes between emission of the first flash of light and emission of the second flash of light by controlling the predetermined time period and/or by calculating the number of synchronization pulses to skip between consecutive trigger signals. As also described above, control unit 114 may be configured to cause lighting device 108A, 108B to emit a second flash of light only a few microseconds after emitting the first flash of light (e.g., by causing the predetermined period of time to be a few microseconds and/or by determining a high speed synchronization based on a calculated number of synchronization pulses to skip between consecutive trigger signals).

In some exemplary embodiments, a device for synchronizing an imaging device with a lighting device may comprise an imaging device configured to capture at least one image of a first object, at least one sensor configured to capture position data associated with positions of a second object, a lighting device configured to emit a light in response to receiving one or more triggering signals, the one or more triggering signals corresponding with one or more synchronization pulses emitted by the imaging device, and a control unit in communication with the imaging device, the at least one sensor, and the lighting device. In some exemplary embodiments, the control unit may be configured to perform steps comprising receiving imaging data, including the at least one image, from the imaging device. The steps may further comprise receiving one or more synchronization pulses from the imaging device, each synchronization pulse being associated with a frame captured by the imaging device. The steps may also comprise receiving position data from the at least one sensor. Further, the steps may comprise determining a sequence of triggering signals by calculating, based on the imaging data and the position data, a number of the one or more synchronization pulses to skip between emissions of successive triggering signals. Additionally, the steps may comprise transmitting the sequence of triggering signals to the lighting device.

It will be apparent to those skilled in the art that various modifications and variations can be made to the disclosed embodiments of the launch monitor. Other embodiments will be apparent to those skilled in the art from consideration of the specification and practice of the disclosed launch monitor. Therefore, it will be understood that the appended claims are intended to cover all such modifications and embodiments, which would come within the spirit and scope of the present disclosure.

What is claimed is:

1. A device for synchronizing an imaging device with a lighting device, comprising:
    an imaging device configured to capture at least one image of a first object;
    at least one sensor configured to capture position data associated with positions of a second object;
    a lighting device configured to emit a light in response to a triggering signal, the triggering signal being determined based on synchronization pulses emitted by the imaging device;
    a control unit in communication with the imaging device, the at least one sensor, and the lighting device, the control unit being configured to:
        receive the synchronization pulses from the imaging device, each synchronization pulse in the synchronization pulses being associated with a frame captured by the imaging device;
        receive the position data from the at least one sensor;
        determine a sequence of triggering signals by calculating, based on the synchronization pulses and the position data, a number of the synchronization pulses to skip between emissions of successive triggering signals in the sequence of triggering signals; and
        transmit the sequence of triggering signals to the lighting device.

2. The device of claim 1, wherein the number of synchronization pulses to skip between the emissions of successive triggering signals is the same.

3. The device of claim 1,
    wherein the control unit is further configured to receive additional data, the additional data including a frame rate associated with the imaging device, and
    wherein calculating the number of the synchronization pulses to skip between emissions of successive triggering signals is based on the additional data.

4. The device of claim 1, wherein the imaging device includes at least two cameras.

5. The device of claim 1, wherein the second object is a golf club and the control unit is further configured to:
    receive additional data including a speed of the golf club, wherein the speed is calculated based on the position data and a distance between the at least one sensor;
    wherein calculating the number of the synchronization pulses to skip between emissions of successive triggering signals is based on the additional data.

6. The device of claim 5, wherein the control unit is further configured to calculate an amount of time during which the golf club or the first object is within a field of view of the imaging device.

7. The device of claim 1, wherein the control unit is further configured to calculate the number of synchronization pulses to skip between emissions of successive triggering signals based on a frame rate associated with the imaging device and a desired number of total emissions of the lighting device.

8. The device of claim 1, wherein the first object is a golf ball.

9. The device of claim 1, wherein the control unit comprises a field programmable gate array (FPGA) or a microcontroller.

10. The device of claim 9, wherein the FPGA or microcontroller receives input data from a computer, the input data including at least one of a desired number of total emissions of the lighting device, a duration of each of the emissions of the lighting device, or a signal to arm the control unit in preparation for receiving data from one of the at least one sensor.

11. The device of claim 10, wherein the FPGA or microcontroller further receives input signals, the input signals including at least one signal from at least one of the at least one sensor that detects the second object.

12. The device of claim 11, wherein the FPGA or microcontroller further outputs a signal to the lighting device based on the received input data from the computer and the received input signals.

13. The device of claim 1, wherein the control unit further comprises a memory configured to store at least one of the position data or data associated with the synchronization pulses.

14. The device of claim 1, further comprising a user device configured to receive additional input data comprising a user input, wherein the control unit is configured to determine the sequence of triggering signals based on the user input.

15. A system comprising:
   an imaging device configured to capture at least one image of a first object;
   at least one sensor configured to capture position data associated with positions of a second object;
   a lighting device configured to emit a light in response to receiving a triggering signal, the triggering signals being determined based on synchronization pulses emitted by the imaging device;
   a control unit in communication with the imaging device, the at least one sensor, and the lighting device;
   at least one memory storing instructions; and
   at least one processor configured to execute the instructions to perform operations for synchronizing the imaging device with the lighting device, the operations comprising:
      receiving imaging data, including the at least one image, from the imaging device;
      receiving the synchronization pulses from the imaging device, each synchronization pulse of the synchronization pulses being associated with a frame captured by the imaging device;
      receiving the position data from the at least one sensor;
      determining a sequence of triggering signals by calculating, based on the imaging data and the position data, a number of the synchronization pulses to skip between emissions of successive triggering signals in the sequence of triggering signals; and
      transmitting the sequence of triggering signals to the lighting device.

16. The system of claim 15, wherein the number of synchronization pulses to skip between the emissions of successive triggering signals is the same.

17. The system of claim 15, the operations further comprising:
   receiving additional data, the additional data including a frame rate associated with the imaging device;
   wherein calculating the number of the synchronization pulses to skip between emissions of successive triggering signals is based on the additional data.

18. The system of claim 15, wherein the second object is a golf club, the operations further comprising:
   receiving additional data including a speed of the golf club, wherein the speed is calculated based on the position data and a distance between the at least one sensor;
   wherein calculating the number of the synchronization pulses to skip between emissions of successive triggering signals is based further on the additional data.

19. The system of claim 18, the operations further comprising calculating an amount of time during which the golf club or the first object is within a field of view of the imaging device.

20. A method for synchronizing an imaging device with a lighting device, comprising:
   capturing position data associated with positions of an object via at least one sensor, the at least one sensor being communicatively coupled to a control unit, a lighting device, and an imaging device, the lighting device being configured to emit a light in response to receiving a triggering signal from the control unit, the triggering signal being determined based on synchronization pulses emitted by the imaging device;
   receiving, at the control unit, the synchronization pulses from the imaging device, each synchronization pulse of the synchronization pulses being associated with a frame captured by the imaging device;
   receiving, at the control unit, the position data from the at least one sensor;
   determining, at the control unit, a sequence of triggering signals by calculating, based on the synchronization pulses and the position data, a number of the synchronization pulses to skip between emissions of successive triggering signals in the sequence of triggering signals; and
   transmitting, from the control unit, the sequence of triggering signals to the lighting device.

* * * * *